United States Patent [19]

James

[11] Patent Number: 5,524,453
[45] Date of Patent: Jun. 11, 1996

[54] THERMAL ENERGY STORAGE APPARATUS FOR CHILLED WATER AIR-CONDITIONING SYSTEMS

[76] Inventor: Timothy W. James, P.O. Box 20091, Santa Barbara, Calif. 93120

[21] Appl. No.: 283,688

[22] Filed: Aug. 1, 1994

[51] Int. Cl.$^6$ .................................................. F25D 3/00
[52] U.S. Cl. ........................................ 62/434; 62/436
[58] Field of Search ........................... 62/430, 431, 434, 62/436, 59, 332

[56] References Cited

U.S. PATENT DOCUMENTS

| | | | |
|---|---|---|---|
| 1,891,713 | 12/1932 | Jordan et al. | 62/434 |
| 3,156,101 | 11/1964 | McGuffey | 62/430 |
| 3,670,522 | 6/1972 | Bresin | 62/333 |
| 4,295,342 | 10/1981 | Parro | 62/119 |
| 4,422,305 | 12/1983 | Grosskopf | 62/430 |
| 4,712,387 | 12/1987 | James et al. | 62/434 |
| 4,756,164 | 7/1988 | James et al. | 62/119 |
| 5,239,839 | 8/1993 | James | 62/434 |

FOREIGN PATENT DOCUMENTS

| | | | |
|---|---|---|---|
| 603427 | 4/1926 | France | 62/430 |
| 1492191 | 7/1989 | U.S.S.R. | 62/430 |

*Primary Examiner*—Henry A. Bennet
*Assistant Examiner*—William C. Doerrler

[57] ABSTRACT

A novel simple, reliable and thermally efficient apparatus for incorporating thermal energy storage in domestic-sized air-conditioning systems is disclosed. This thermal energy storage apparatus for chilled water air-conditioning systems incorporates a chilled-water (or other chilled liquid) loop with two previously patented apparatus. The addition of a reliable and low cost chilled water loop to thermal energy systems for domestic-sized air-conditioning systems enables simple citing and modular construction of the thermal energy storage apparatus

4 Claims, 3 Drawing Sheets

THERMAL ENERGY STORAGE APPARATUS FOR CHILLED WATER AIR-CONDITIONING SYSTEMS

BACKGROUND

1. Field of the Invention

The present invention relates to the field of thermal energy storage (TES) apparatus and methods for use in refrigeration and air conditioning systems. This invention pertains to an apparatus for economical and efficient heat transfer to and from the thermal energy storage media.

2. Prior Art

In several regions of the US, domestic and commercial air-conditioning are substantial contributors to peak electrical loads. Because these peak loads often exceed the local electrical utilities baseline generating capacity, the utilities must use less efficient generation systems (e.g., gas turbine powered) to provide power at the peak times. This situation has convinced the electrical utilities and operators of many large commercial air-conditioning systems to install TES systems that utilize the lower cost electrical power available at night to store cooling capacity for use during the daytime. These large TES installations take advantage of economics of scale, and utilize systems that are efficient and economical in large systems but are not applicable to the smaller air-conditioning systems used for domestic cooling. This invention provides an economical and efficient TES apparatus for use in the smaller (typically domestic) air-conditioning systems, which are also substantial contributors to the peak daytime electrical demand.

Currently there are no generally accepted methods for using thermal energy storage in small (e.g., ~3 ton domestic) air-conditioning systems, This is in part due to the lack of a thermally efficient, simple, reliable, and low cost method or apparatus for transferring heat in and out of a low cost thermal energy storage media.

SUMMARY OF THE INVENTION

The apparatus described here provides for economical and efficient TES in small air-conditioning systems. This apparatus is a substantial improvement over prior art, which has failed to produce an apparatus with acceptable cost and performance for widespread use. Specifically this invention combines a chilled water system (for economic and efficient space cooling remote from the TES medium) with a previously patented heat pipe apparatus (James and Wyman U.S. Pat. No. 4,756,164; "Cold Plate Refrigeration Method and Apparatus") for efficiently transferring heat in and out of the TES medium. The improvement over James and Wyman being the addition of a chilled water loop to transfer heat from the refrigerated space to the thermal energy storage apparatus instead of requiring that the heat-pipe apparatus transfer heat directly between the TES medium and the refrigerated space. This improvement permits locating the TES medium in a convenient place rather than requiring it to be adjacent to the refrigerated space or requiring that air for cooling be forced to pass over a heat exchanger immediacy adjacent to the TES medium. This invention also readily lends itself to modular construction such that multiple TES containing modules can be simply plumbed together to provide the desired capacity. With the singular exception of a simple chilled water circulating pump, the apparatus has no moving parts. Further refinements for maximizing efficiency and minimizing cost include the addition of a previously patented means for utilizing water as the TES medium (U.S. Pat. No. 5239839 "Thermal Energy Storage Apparatus Enabling Use of Aqueous or Corrosive Thermal Storage Media").

Incorporating TES with a chilled water system for small domestic air-conditioning systems produces a system that is readily retrofitted into existing central forced air systems and is compatible with new installations using circulating liquid to heat or cool walls, floors, radiators, or forced air coils. Retrofit can be as simple as converting an existing direct-expansion cooling-coil to chilled-water operation, installing a TES module or modules, connecting the TES modules to the cooling coil via a chilled-water loop, and connecting the evaporators of the TES modules to the existing condensing unit. New system installations utilizing chilled-water cooling gain additional cost reduction and energy savings relative to a forced air system by eliminating the need for ductwork, large circulating fans, and the attendant power consumption.

Figure 1:
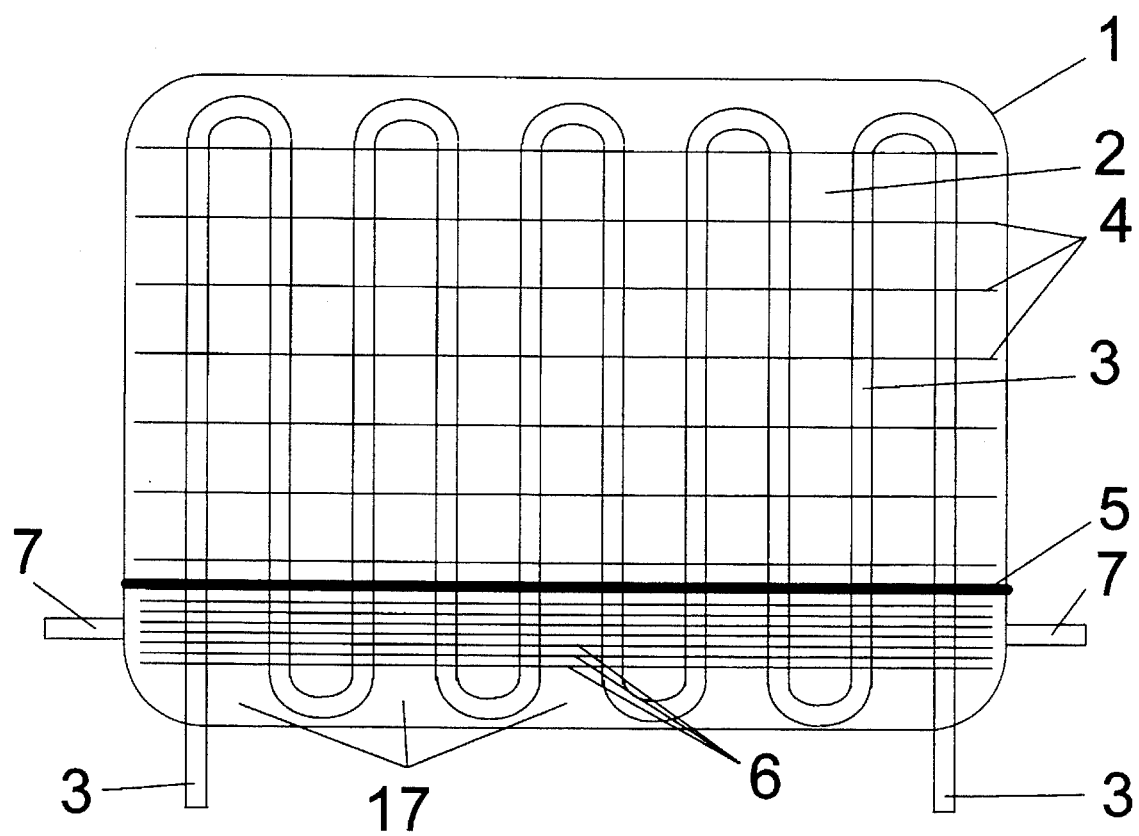
FIG. 1 is a schematic illustration of the internal components of a single modular implementation of the thermal energy storage apparatus for a chilled water cooling system.

| Reference Numerals In Drawings |
| --- |
| 1 insulated container |
| 2 Thermal Energy Storage medium |
| 3 serpentine-tube heat exchanger |
| 4 fins |
| 5 barrier |
| 6 fins |
| 7 tubes |
| 8 multiplicity of small capsules |
| 9 naturally convecting fluid |
| 10 circulating pump |
| 11 interconnecting piping |
| 12 heat exchanger |
| 13 expansion device |
| 14 refrigeration system interconnecting tubing |
| 15 compressor |
| 16 condenser |
| 17 circulating liquid |

DETAILED DESCRIPTION

I present a thermal energy storage apparatus for chilled-water (or other circulating chilled liquid) air-conditioning systems. In the following I present numerous details to provide a thorough understanding of the invention. However, it will be apparent to one skilled in the art that the invention may be practiced without these specific details. In other instances, in order not to obscure the present invention unnecessarily, I have not described in detail well-known refrigeration components such as valves, pumps, condensers, compressors and heat exchangers.

In a preferred embodiment the invention uses low cost and thermally efficient fin and tube heat exchangers. Referring to FIG. 1, an embodiment comprises a TES module consisting of an insulated container 1 enclosing a serpentine-tube heat exchanger 3, the container also being divided into two volumes by a barrier 5. Barrier 5 does not block flow in tube 3. A TES medium 2 that is capable of absorbing and releasing large quantities of heat fills the upper volume surrounding and in direct physical and thermal contact with the fins 4 and tube 3 heat exchanger. A liquid 17 circulating through the lower volume via tubes 7 making intimate thermal and physical contact with the tubes 3 and fins 6 of the heat exchanger fills the lower volume. The barrier 5 serves to separate the TES material 2 and the circulating liquid 17.

Figure 2:
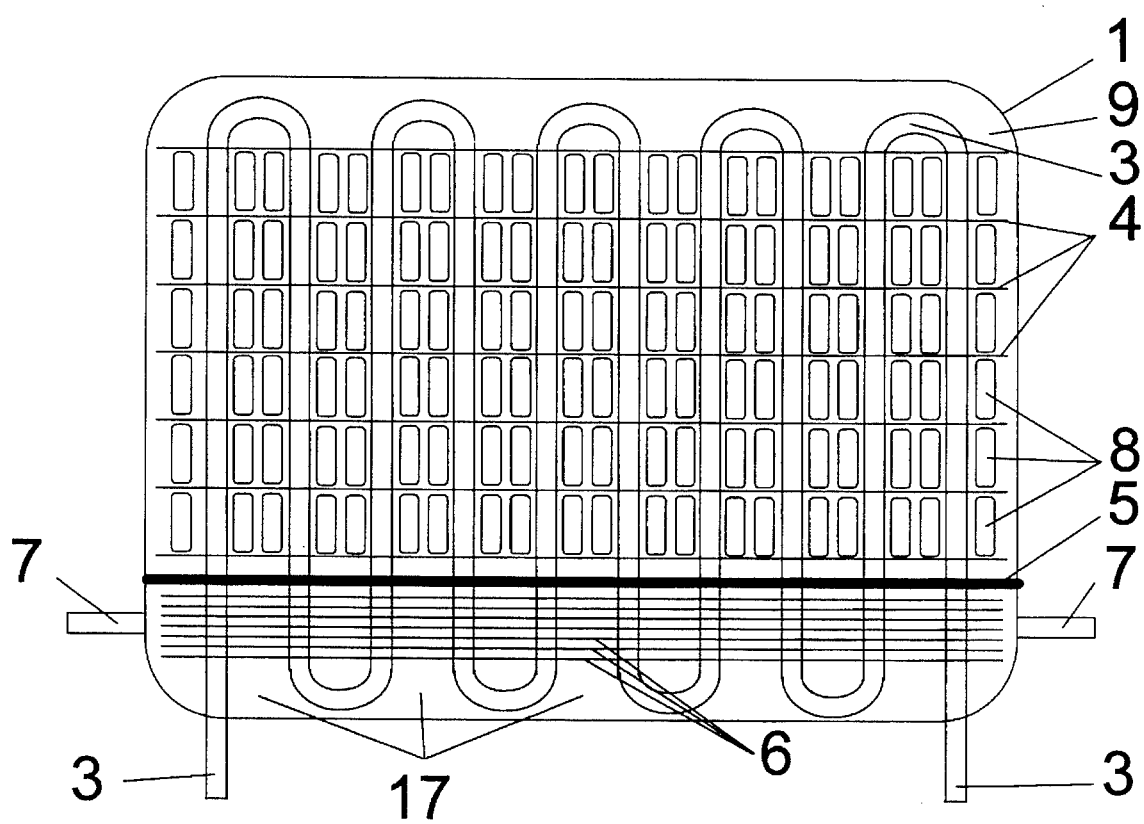
FIG. 2 is a schematic illustration of the internal components of a single modular implementation of the thermal energy storage apparatus for chilled water cooling systems in a preferred embodiment incorporating thermal energy storage apparatus for use of aqueous or corrosive thermal energy storage media.

In an embodiment, the TES module is filled with a eutectic or pure material exhibiting a phase change at the appropriate temperature for a particular application, i.e., air-conditioning, refrigeration or freezing. FIG. 2 illustrates a preferred embodiment for air-conditioning in which the TES medium consists of a multiplicity of small capsules 8 filled with water as in James, U.S. Pat. No. 5,239,839. A naturally convecting liquid 9 thermally connects the fins 4 and tube 3 heat exchanger to the capsules 8.

Figure 3:
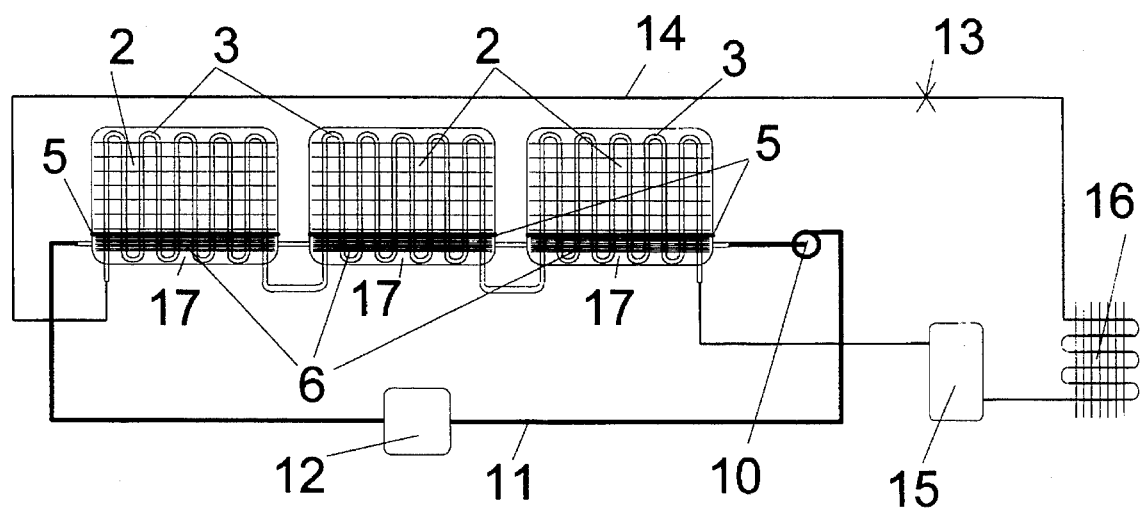
FIG. 3 is a schematic diagram illustrating a typical arrangement of the major components of the present invention incorporated into a chilled water cooling system. In this case the system uses three TES modules connected in series.

FIG. 3 illustrates the TES modules, additional components and their functional relationships in this thermal energy storage apparatus. The diagram of FIG. 3 shows three TES modules connected in series. A conventional refrigeration system comprising a volume of refrigerant (contained within the refrigeration circuit), a compressor 15, condenser 16, expansion device 13, interconnecting tubing 14, and evaporator tubes 3 removes heat from both the TES medium 2 and circulating liquid 17 when the compressor 15 is energized. A circulating pump 10, circulating liquid 17, interconnecting piping 11, a heat accepting heat exchanger 12, and three heat exchangers comprising tubes 3 and fins 6 situated within the TES modules below barriers 5 comprise a chilled water cooling circuit. Heat rejected from the circulating liquid 17 to the lower three heat exchangers situated within the TES modules below barriers 5 is absorbed by passive melting of the TES medium via heat transfer in the vertical heat pipes or by conventional cooling with compressor 15 energized.

There are three distinct operating modes for this TES apparatus. They are 1) ice making (i.e., storing cooling capacity), 2) cooling by melting ice, and 3) cooling by combined ice melting and conventional refrigeration. In the ice making mode (1) the conventional refrigeration system consisting of compressor 15, condenser 16, expansion device 13, interconnecting tubing 14, and evaporator tubes 3 removes heat from the TES medium 2 (water in the preferred embodiment) until it freezes. During cooling by melting ice (mode 2), heat is accepted by heat exchanger 12 in thermal contact with the refrigerated space and the circulating liquid 17 hence warming liquid 17. Pump 10 and interconnecting piping 11 force liquid 17 over fins 6 and tube 3 heat exchanger below barrier 5. Heat from liquid 17 causes refrigerant in tube 3 to boil hence cooling liquid 17. The vaporized refrigerant travels up tube 3 recondensing by transferring heat to the TES material and melting it. The recondensed refrigerant returns by gravity to the region inside tube 3 below barrier 5 to repeat the cycle until all of the TES medium melts.

In mode 3 (cooling by combined TES medium melting and conventional refrigeration), melting TES medium 2 provides cooling capacity in addition to that provided by the conventional refrigeration system. Both the conventional refrigeration system and the melting TES medium remove heat from the circulating liquid 17 through the fins 6 and tube 3 heat exchanger. Mode 3 permits using a smaller compressor 15 and condenser 16 than would otherwise be required for a given peak cooling capacity.

I claim

1. A thermal energy storage apparatus for air-conditioning systems, said system comprising:

an insulated enclosure containing a first heat exchanger surrounded by and in thermal contact with a thermal energy storage medium, a second heat exchanger for chilling a circulating liquid for use in removing heat from a region remote from the second heat exchanger, the second heat exchanger placed below the first heat exchanger, and a plurality of tubes interconnecting the two heat exchangers such that said first heat exchanger, said second heat exchanger, and said plurality of tubes form the evaporator of a refrigeration system.

2. An apparatus for refrigeration comprising a refrigeration system having a volume of refrigerant, a compressor, a condenser, a thermal energy storage medium, and an evaporator assembly comprising an upper heat exchanger in thermal communication with said thermal energy storage medium and a lower heat exchanger in thermal communication with a liquid, said upper and lower heat exchangers being joined by a plurality of tubes;

activating the compressor in said refrigeration system absorbs heat from said thermal energy storage medium and liquid in thermal communication with said lower heat exchanger;

deactivating the compressor in said refrigeration system allows said refrigerant to condense in the portion of the said tube assembly in said upper heat exchanger and to evaporate in said portion of tube assembly in lower heat exchanger;

where by said plurality of tubes act as heat pipes transferring heat from said liquid in contact with said lower heat exchanger to said thermal energy storage medium without any external input of power;

the said refrigeration apparatus further comprising a chilled water circuit comprising a circulating pump to force said liquid across said lower heat exchanger, a heat exchanger for cooling remote from the lower heat exchanger, and interconnecting piping to circulate the said liquid through said lower heat exchanger and said remote heat exchanger;

activation of said circulating pump provides cooling for said remote heat exchanger.

3. The apparatus of claim 1 where the apparatus is constructed as a standard capacity module, multiple modules are connected in series or parallel to provide appropriate thermal energy storage capacity.

4. The apparatus of claim 1 where the apparatus is constructed as a standard capacity module to minimize individual module weight and size for ease of transport and installation and to minimize manufacturing cost by maximizing manufacturing quantities of a minimum number of versions.

* * * * *